Aug. 8, 1961 R. W. PETER ET AL 2,995,711

AMPLIFIERS AND/OR GENERATORS EMPLOYING MOLECULARLY RESONANT MEDIA

Original Filed May 21, 1956 6 Sheets-Sheet 1

INVENTORS
JAMES P. WITTKE
ROLF W. PETER

BY J. L. Whittaker
ATTORNEY

INVENTORS
JAMES P. WITTKE
ROLF W. PETER

BY J. L. Whittaker
ATTORNEY

INVENTORS
JAMES P. WITTKE
ROLF W. PETER
BY J. L. Whittaker
ATTORNEY

INVENTORS
JAMES P. WITTKE
ROLF W. PETER
BY J. C. Whittaker
ATTORNEY

Aug. 8, 1961 R. W. PETER ET AL 2,995,711

AMPLIFIERS AND/OR GENERATORS EMPLOYING MOLECULARLY RESONANT MEDIA

Original Filed May 21, 1956 6 Sheets-Sheet 5

INVENTORS
JAMES P. WITTKE
ROLF W. PETER

BY J. L. Whittaker

ATTORNEY

Aug. 8, 1961 R. W. PETER ET AL 2,995,711

AMPLIFIERS AND/OR GENERATORS EMPLOYING MOLECULARLY RESONANT MEDIA

Original Filed May 21, 1956 6 Sheets-Sheet 6

INVENTORS
JAMES P. WITTKE
ROLF W. PETER
BY J. L. Whittaker
ATTORNEY 2,995,711

AMPLIFIERS AND/OR GENERATORS EMPLOYING MOLECULARLY RESONANT MEDIA

Rolf W. Peter, Cranbury, and James P. Wittke, Princeton, N.J., assignors to Radio Corporation of America, a corporation of Delaware Continuation of application Ser. No. 586,140, May 21, 1956. This application June 18, 1959, Ser. No. 821,324
7 Claims. (Cl. 330—4)

The present application is a continuation of application Serial No. 586,140, filed May 21, 1956, now abandoned.

This invention relates generally to microwave generation and amplification by means of gas molecular resonance. More particularly, the invention relates to improved methods of and means for controlling the flow of molecularly resonant gases in improved microwave amplifying or generating apparatus, and the interaction between microwaves and molecularly resonant gases.

It is known that a microwave chamber containing molecularly resonant gas amplified microwave energy passed through the gas when the proper relation exists between the frequency of the microwave energy, the geometry and losses of the chamber, and the distribution of the molecules among the energy states of the molecularly resonant gas. One amplifying device of this kind depends for its operation on the formation of beams of molecularly resonant gas having a condition of unstable internal molecular energy distribution in which there are more molecules in the upper of two coupled energy levels than in the lower of two coupled energy levels. This gas is formed by selective extraction of molecules of gas having a particular internal energy state from a reservoir of molecularly resonant gas. Operation of a chamber such as a cavity resonator as an amplifier also depends on the injection of this gas into the chamber. The quantity of this gas in the amplifying chamber determines the amount of amplification that is obtained.

As referred to herein, a molecularly resonant gas will be termed an "active" gas when it is in the above-mentioned unusual condition of unstable internal energy distribution. Gas in this "active" condition is able to amplify microwaves by releasing its internal energy as useful electromagnetic radiation. Similarly, "inactive" gas refers to gas which is not in a condition to emit electromagnetic radiation. A more detailed description of these gas conditions is presented later.

Devices which utilize this "active" gas condition generally include a source of molecularly resonant gas such as ammonia; means for selectively extracting an "active" gas component from the normal gas source; means for injecting the "active" gas into a cavity resonator, waveguide, or the like; means for introducing microwaves into the cavity resonator; means for removal of output microwave energy; means for removal of the gas from the cavity resonator after the gas has become "inactive"; and a surrounding air-excluding envelope. No microwave input is needed where the device is used as an oscillator rather than an amplifier.

Such microwave generator or amplifier devices of this kind previously have been able to produce only a relatively low density of "active" gas in the cavity resonator, and so have been limited in their power output or amplification.

It is not possible to introduce more "active" gas into the cavity resonator of such a device by simply increasing the pressure of the gas source. This is because of a limitation of the means for injecting "active" gas into the cavity resonator which occurs with increased pressure. The "active" gas is formed into narrow collimated beams for injection into the cavity resonator, as will be described in detail later. As the pressure of the gas source is increased, the means for injecting the collimated "active" gas beam loses directivity, and fails to deliver an increased amount of "active" gas to the cavity resonator, where it can be utilized.

Such devices are also subject to possible limitation of their performance by the tendency to accumulate "inactive" gas in the cavity resonator, which increases losses by absorbing microwave energy and by scattering the incoming "active" gas. This results in lowered amplification and lowered signal-to-noise ratio.

A further serious limitation of such devices has been in connection with the removal of "inactive" gas from the vicinity of the cavity resonator. This has commonly been done by condensing the "inactive" gas on the cavity walls, or in other cooled surfaces so located as to be in the path of the "inactive" gas molecules to be collected. The condensation occurs as a freezing-out of the "inactive" gas as a solid rather as condensation in liquid form, because a gas such as ammonia will not condense as a liquid in the range of pressures used. After a period of operation, a device of this kind becomes clogged with the frozen condensed gas. Arcing may occur at certain high voltage regions, cavity resonator "Q" may be lowered, and eventually the frozen condensed gas interferes with the flow of gas into and out of the cavity resonator. The resulting loss of power output requires that the device be periodically turned off and cleared of frozen condensed gas before operation can be resumed. In a device of this kind, a more or less copious supply of gas must be provided, for the gas is used once and discarded rather than recirculated.

An object of this invention is to provide a molecular microwave amplifier or generator having improved power output and amplification.

Another object of this invention is to provide improved methods and apparatus for producing higher "active" gas density in a molecular microwave amplifier or generator cavity resonator than was previously possible.

Another object of the present invention is to provide improved methods and apparatus for lowering the residual "inactive" gas pressure in a molecular microwave amplifier or generator cavity resonator.

Another object of the invention is to provide an improved molecular microwave amplifier or generator capable of continuous operation for long periods of time.

Another object of the invention is to provide an improved molecular microwave amplifier or generator having a cavity resonator which requires no refrigeration and no removal of frozen condensed gas.

Another object of the invention is to provide novel methods of and means for recirculating, for re-use, a molecularly resonant gas in a molecular microwave amplifier or generator.

The foregoing and other objects and advantages may be accomplished in accordance with the present invention by apparatus wherein two or more "active" gas molecular beams are so directed as to intersect each other, and thereby form a relatively dense body of "active" gas in a region of interaction with a microwave field within a cavity resonator. The gas beams do not act as fluids at the low pressure used, so they are able to penetrate and pass through each other without the chaotic turbulent interference that is characteristic of the collision of fluid beams. The densities of gas molecules of the separate beams are additively superposed in the region where the beams penetrate each other, resulting in a region of beam overlap having a higher density than the original density of any single beam. There is more stored molecular energy available from this more concentrated "active" gas for release as microwave energy output.

Another aspect of the invention is concerned with the removal of "inactive" gas from the vicinity of the region of interaction between a microwave field and a body of molecularly resonant gas. In this aspect of the invention, the residual background gas pressure due to "inactive" gas is lowered by means of one or more beams of a second gas used to pump away the "inactive" gas. This effect is similar to the action of a vacuum diffusion pump. This second pumping gas, such as mercury vapor, is chosen to have molecules which are chemically inert with respect to the resonant gas and preferably heavier than the molecules of the molecularly resonant gas, such as ammonia, used to interact with the microwave field in the cavity resonator. The pumping gas is directed to pass near the cavity resonator, and is injected at high velocity. This pumping gas beam passes by the cavity resonator, captures and entrains molecules of the "inactive" molecularly resonant gas, thus carrying the "inactive" gas away with it. The heavy pumping gas is then separated from this light "inactive" gas, and both gases are then recirculated and re-used.

In a preferred embodiment of the invention, ammonia is utilized as the molecularly resonant gas, and mercury vapor is utilized as the pumping gas. The ammonia passes through collimator passages and is formed into a number of collimated gas beams directed from a circle radially inward toward the center, like the spokes of a cartwheel. A cavity resonator is located at the center where the ammonia gas beams meet. As the ammonia gas beams approach the cavity resonator, they must first pass between grids which are positioned radially between the gas beams, and charged to appropriate high voltages. The "inactive" component of the ammonia is dispersed from the collimated gas beams by a field effect of the grids to be described later. Conversely, the "active" component is concentrated by the grids into relatively small beams which enter the cavity resonator through entrance ports in the cavity wall. The grid arrangement, therefore, acts as a separator and focuser for the "active" molecules. The "active" ammonia beams intersect in the cavity, forming a relatively dense body of "active" gas. A microwave signal having the characteristic molecular resonance frequency, which is also the cavity resonance frequency, is introduced into the cavity via a waveguide. The microwave signal is amplified by the transfer of stored molecular energy from the "active" gas into the energy of the microwave field.

The gas beams diverge from the cavity resonator mainly as "inactive" gas beams, after having been stripped of part of their resonance energy. These "inactive" gas beams recede from the cavity, and are intercepted by the mercury vapor pumping beams. The ammonia and the mercury vapor are separated later by condensation of the mercury vapor.

In a second embodiment of the invention, the "active" gas beams are injected at opposite ends of the cavity resonator. They are directed towards each other, along the axis of the cavity resonator.

In a third embodiment, the beams of the above embodiment are utilized together with the radially injected beams of the first embodiment.

Similar reference characters are applied to similar elements throughout the drawings.

*Energy levels*

Figure 1:
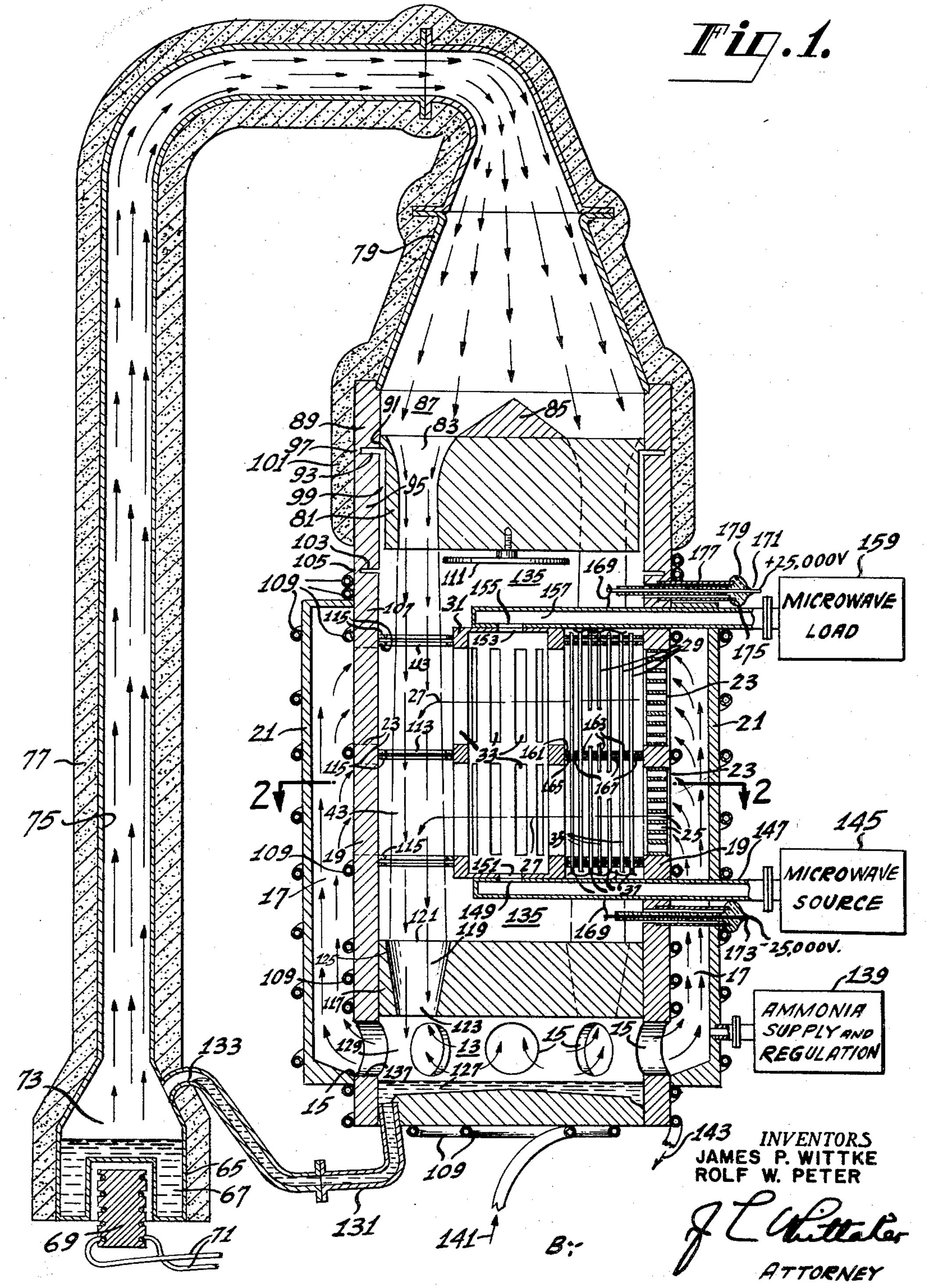
FIGURE 1 is a central sectional elevational view along the section line 1—1 of FIGURE 2, of a preferred embodiment of the invention.

It is known that the molecules of a gas have internal energies which may differ from each other. The total internal energy of any molecule is said in the art to be "quantized;" that is, it must take only certain fixed values, and cannot occur in amounts in between these fixed amounts of energy. A molecule may then be described as occupying, for a time, some energy "level," by which is meant that the molecule has one of a number of definite specified amounts of stored internal energy.

*Energy release*

It is further known that a molecule in the upper of two coupled energy levels will spontaneously drop to the lower energy level, take on a new and lower amount of stored total internal energy, and dispose of the excess energy due to the difference between the previous higher amount of stored energy and the new lower amount of stored energy. In many cases this energy is released from the molecule in the form of electromagnetic radiation.

The inverse effect also occurs, that is, electromagnetic radiation passing through a body of gas may be partly absorbed by the gas molecules. The total molecular energy must increase in this case, and the molecules are then said to have undergone transitions to higher energy levels. A molecule may only experience certain energy level transitions specified by a system of rules known as "selection rules." Any two energy levels between which the molecule may pass directly, as formulated in the "selection rules," are referred to as "coupled" energy levels. There are many pairs of "coupled" levels possible for any molecule.

*Molecular resonance*

It is known that when a "coupled" molecular energy level transition results in electromagnetic radiation, the "frequency" of the electromagnetic radiation is specifically determined by the "amount" of stored internal molecular energy being converted to radiation in each molecule. The higher the energy conversion, the higher the corresponding frequency of the electromagnetic radiation. The term "molecular resonance" refers to an energy exchange between electromagnetic radiation of a characteristic frequency and a stored internal molecular energy increment (or decrement) of characteristic amount. The term refers either to absorption or emission of radiant energy.

The quantized nature of the energy levels causes the range of possible energy transitions between "coupled" energy levels also to be quantized. Consequently, the many possible frequencies of radiation that a gas may absorb or emit by molecular resonance are quantized. This quantized restriction of frequency and energy range is a primary characteristic of molecular resonance.

*Population of energy levels*

The molecules of a gas are normally in constant interchange between energy levels, occupying each level for only a short time before undergoing a transition to another energy level. In this changing situation we may refer to the average number of molecules having a particular internal energy as the "population" of the particular energy level. Although no one particular molecule is identified with a particular energy level for more than a short period of time, the populations of the energy levels are relatively stable, for there are large numbers of molecules present even in a small body of gas.

It is known that the possible energy levels are not equally populated by molecules of the gas, but that for gases in a condition of thermal equilibrium, each energy level contains fewer molecules than any lower energy level, and more molecules than any higher energy level. This population distribution is known as the Boltzmann distribution.

The distribution of molecular population outlined above is an equilibrium condition characteristic of gases, in which they absorb radiant energy from their surrounding environment in an amount equal to the amount of radiant energy they emit to the surrounding environment. In such cases, no net interchange of energy occurs between the gas body and its environment. The various pairs of "coupled" energy levels are in radiation and kinetic equilibrium with their environment. The lower level of each pair of "coupled" levels has a greater molecular population than its paired upper level, as described by the Boltzmann distribution.

*"Active" gas*

It has been found possible to provide a gas having a molecular population, in a certain selected energy level, which is greater than the molecular population in a particular second lower coupled energy level. This molecular population distribution is not an equilibrium condition. It tends, however, to revert to the usual equilibrium condition, wherein molecular population of energy levels decreases with increasing energy level. This process of reversion to equilibrium population distribution can be accompanied by the emission of electromagnetic energy, as downward molecular energy level transitions occur between the "coupled" energy levels.

The gas being used, such as ammonia, has a number of coupled energy levels, each pair capable of molecular resonance. These coupled pairs of energy levels may have a Stark effect such that the high energy levels are raised even higher by an electric field and the coupled low energy levels are dropped even lower in energy by the field.

The high energy level molecules of such a coupled pair of energy levels are the molecules utilized in this invention for the generation or amplification of microwaves.

A gas in a condition such that there are more molecules in the upper than in the lower of two coupled energy states is referred to herein as an "active" gas, for it is capable of emitting its energy as an amplified electromagnetic wave signal. The frequency of this signal is determined by the energy difference between the two selected coupled energy levels. The beam of gas described here has been made "active" for all coupled pairs of energy levels which have a Stark effect acting in a direction to raise the high energy level and lower the low energy level.

*"Active" gas beam formation*

The formation of the above-described "active" gas is accomplished by directing a stream of a molecularly resonant gas having coupled levels with the herein above described Stark effect parallel and close to a grid of rods, wires or the like, having a high potential difference applied between alternate rods, such that a higher potential gradient is formed in the immediate vicinity of the grid rods than at a distance from them. It is known that those high internal energy gas molecules which are subject to an increase in internal energy due to the Stark effect are deflected away from the grid. The deflection is caused by forces arising due to the Stark effect occurring in connection with the field gradients near the grid. The increase in internal energy due to the Stark effect is supplied by subtracting energy from the kinetic energy of the molecule. This reduces the component of velocity of the molecule perpendicular to the beam axis, toward the region of high gradient around the grid, so the high energy level molecules are deflected away from the grid. Conversely, some of the internal molecular energy of the low energy molecules is converted into the kinetic energy of molecular motion in a region of high field. The surplus of kinetic energy due to lessened internal energy appears as an increase in the molecular velocity component perpendicularly out of the beam. Low energy gas molecules subject to lowering of energy level due to the Stark effect, and moving near the grid wires are deflected toward the grid wires by this converse effect.

As the gas beam passes the grid, its proportion of high energy level molecules to low energy level molecules changes. Initially, the gas contains a Boltzmann distribution of molecules at all available energy levels. As the gas moves past the grid, the lower energy molecules of the various coupled pairs of energy levels are deflected toward the grid and removed from the original gas beam. These molecules are passed through the grid or first hit the grid and then diffuse through it and are removed. The remaining beam becomes relatively more densely populated in those "active" higher energy molecules of each pair of cooperating energy levels which are somewhat deflected away from the plane of the grid. This "active" gas beam is directed toward a cavity resonator. The wall of the cavity resonator is provided with an aperture having a size and shape corresponding to the size and shape of the "active" gas beam.

By locating the aperture in the path of the "active" gas molecules, these molecules may be made to pass into the cavity resonator, where they release their energy as microwave radiation.

*Microwave resonance in a cavity resonator*

An "active" gas may be utilized for the release of its internal energy at any of a number of characteristic frequencies. The release of this energy may occur, to some extent, at all the frequencies possible for molecules which have been made "active" by the grid focusing. A particular cooperating pair of coupled energy levels may be utilized, however, by directing the active gas beam into a cavity resonator, or the like, in which an electromagnetic field of the related frequency has been established.

When radiation due to a molecular resonance energy level transition occurs in the presence of an existing electromagnetic field having the frequency characteristic of the transition, the separate molecules radiate in phase with the existing field and with each other. This radiation is a coherent output, at the selected excitation frequency.

This energy is added to the energy of the existing electromagnetic field, and serves to amplify the existing field. The amplifying interaction may occur in a field of electromagnetic radiation propagating from a source through a molecularly resonant gaseous medium, or may be enhanced by the establishment of a field in a cavity resonator filled with molecularly resonant gas.

*Preferred embodiment*

Referring to FIGURE 1, ammonia gas passes from a mercury condensation chamber 13, through openings 15 into an ammonia distribution manifold chamber 17 between an inner cylinder 19 and an outer cylinder 21. The ammonia gas flows upward in the manifold chamber 17 until it reaches a number of collimator ports 23. The collimator ports contain honeycomb shaped collimating structures, having many gas permeable passages 25 directed toward the axis of the inner cylinder 19. The gas permeable passages 25 are long compared to their width, and serve to direct the ammonia in narrow collimated beams 27 past focusing grids 29 toward a cavity resonator 31 located on the axis of the inner and outer cylinders 19 and 21.

A typical collimator honeycomb structure 23 consists of metallic plugs about ¼" thick, pierced by a large number of holes 25 which may be, for example, .003" in diameter and ¼" long. This configuration of relatively long thin passages may be formed by any of several means, including, for example, the assembly of metal foil parts, shaped so as to leave similar passages between them when assembled. The diameter of the inner cylinder 19 would typically be about 16" and the cavity resonator 31 can be, for example, about ½" in diameter and 6" long, for operation at a resonance frequency in the microwave frequency range. The cavity diameter has been drawn somewhat larger, in the figures, so that its details may be seen. Other parts of the apparatus preferably would be dimensioned about as indicated by the scale of the figures, in relation to the dimensions given above.

The beams 27 are shaped by the collimator ports 23 to be relatively narrow and high, so as to correspond generally with the slots 33 in the cavity resonator 31. The beams 27 are rectangular in cross-section, so they may be thought of as "slab-shaped" beams. The use of "slab-shaped" beams results in the injection of more "active" gas into the cavity resonator than would be had with beams of circular cross-section of a diameter comparable to the width of the "slab-shaped" beams.

The central portion of the cavity resonator 31, which lies in a horizontal mid-plane between the upper and lower groups of slots 33 is not well suited, and not used, for the radial injection of "active" gas beams 27. The microwave field in this region would subject the "active" molecules to excitations of different phase as the molecules pass through the cavity, due to the configuration of the $TM_{012}$ mode of field used here.

In passing the focusing grids 29, the "active" component of the ammonia is focused into beams small enough to enter the cavity resonator 31 through entrance slots 33, while the "inactive" component of ammonia is dispersed from the beams 27 and passes through the grids 29, or first strikes the grids and then diffuses through them. This will be better appreciated by reference to FIGURE 2.

Figure 2:
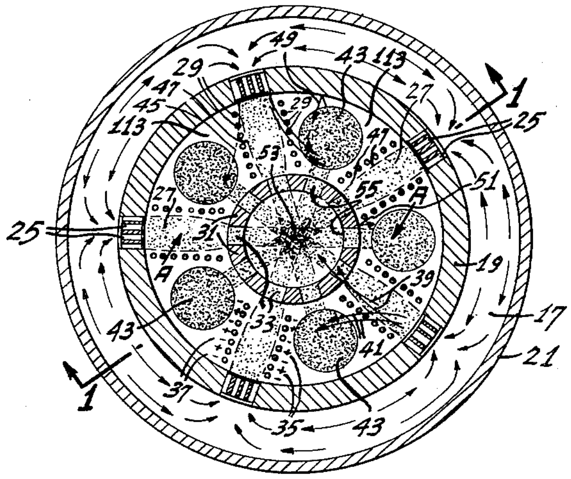
FIGURE 2 is a sectional top view of the apparatus of FIGURE 1, along section line 2—2 of FIGURE 1.

In FIGURE 2 the locaton of the ammonia beam 27 between the grids 29 can be seen. The grid rods may be about ¼" in diameter, spaced from each other about ¾" between centers. The rods 35 are connected to a source of potential highly different from the potential of the alternate grid rods 37. Potentials such as +25,000 v. may be applied to rods 35 and —25,000 v. applied to rods 37. The potentials applied to the alternate set of grid rods 35 and 37 may be equal in voltage and opposite in polarity, or one set may be grounded and the other set at a high positive or negative potential. Other voltages may be used, as long as a high potential difference exists between rods 35 and 37.

Figure 9:
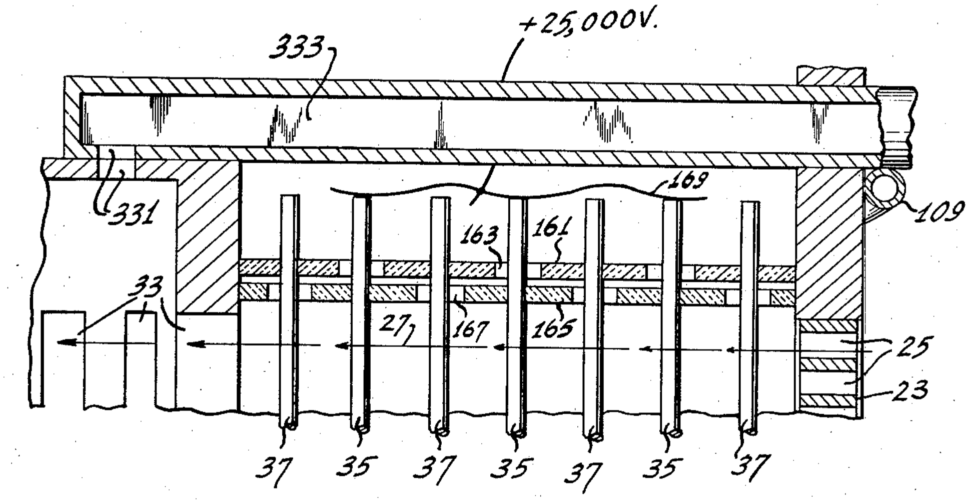
FIGURE 9 is an enlarged fragmentary sectional view of a portion of the apparatus of FIGURE 6.

A high electrostatic potential gradient is formed at the regions surrounding the grid rods, in contrast to a low gradient in the regions near the central part of the ammonia beam 27. The grid structure is shown better in FIGURE 9. FIGURE 9 illustrates the grid portion of an embodiment which is not being described here, but which has an identical grid structure. The numbers of the waveguide 333 and holes 331 do not apply in this description, but all other parts are accurately revealed and clearly seen in FIGURE 9.

Referring to FIGURE 9, in order to minimize arcing between the grid rods over the surface of the grid rod supports, separate supports are used for grid rods of different potentials. The grid rods 37 are supported by insulators such as mica disks 161. These disks have clearance holes 163 around the grid rods 35 which are at a potential highly different from the potential of grid rods 37. Similarly, the mica disks 165 support grid rods 35 and are provided with clearance holes 167 around grid rods 37. Returning to FIGURE 1, the potentials on these grid rods are supplied from wires 169 connected to insulated, vacuum-tight lead-in wires 171 and 173. A long insulated path is formed at the surfaces 175 and 177 by the glass 179 used in the glass-to-metal seal of the lead-in, as is known in the art.

Potentials such as +25,000 v. and —25,000 v. are supplied to the lead-in wires 171 and 173 from external voltage sources, as indicated in FIGURE 1. Referring again to FIGURE 2, molecules having the higher internal energy of a pair of coupled energy levels such as have been described, pass near the grid 29 and are subjected to the field of high gradient. Due to the Stark effect, high energy level molecules are deflected away from the grid into the beam 27 as shown by paths 39. Conversely, low energy level molecules pass through the grid 29 as shown in paths 41, or first strike the grid and then diffuse through it. These deflection effects are known in the art.

The low energy, or "inactive" molecules 41 pass into the region of beams of mercury vapor 43 which move perpendicular to the drawing of FIGURE 2. The mercury vapor beams 43 entrain these "inactive" molecules and remove them from the vicinity of the cavity resonator 31. The dispersed "inactive" beam is shown at 45, in contrast to the focused "active" beam 47. Any other background gas molecules 49 and 51 that may occur in the region of the mercury vapor pumping beams 43 are susceptible to removal by the pumping beams 43.

The focused "active" beams pass into the cavity resonator 31 through ports 33. The "active" beams 47 intersect in the central region of the cavity resonator, penetrating each other and forming a body of "active" gas 53 having a density which has been increased substantially beyond that found in any single beam 47. The gas beams 47 become "inactive" in the cavity resonator after leaving the region of the body of "active" gas 53. The beams then pass through exit ports 55 provided in the cavity resonator, and continuing in their former direction, enter the pumping beams of mercury vapor 43. The "inactive" gas beams 45 are entrained in the mercury vapor pumping beams 43, and are removed from the vicinity of the cavity resonator 31.

Figure 3:
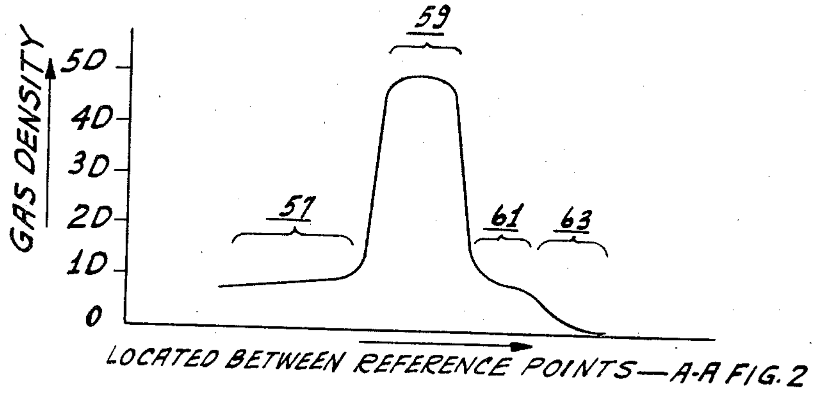
FIGURE 3 is a graph showing the approximate "active" gas density in the apparatus of FIGURES 1 and 2, along a line A—A of FIGURE 2.

The density changes in the ammonia beam and the effect of the intersection of an ammonia beam with other ammonia beams, and with a mercury vapor beam, is shown in the graph of FIG. 3.

Referring to FIG. 3, the abcissa of the graph corresponds to the portion of a beam lying between reference letters A—A in FIG. 2, and the ordinate of the graph indicates the relative density in the beam. For a standard of comparison, the density of active gas at the cavity entrance port 33 is labeled 1D, on the graph. A first portion 57 of the graph shows a slight increase in the density of active gas in the beam 47 as it travels past the focusing grids 29 and approaches the cavity resonator 31. This active gas density increase is due to convergence of the active gas molecules 39 toward the cavity axis.

A second portion 59 of the graph illustrates the increase in density where the active beams 47 intersect at the cavity resonator center 53. As these beams are relatively rarified, before they intersect, the majority of the gas molecules of each beam penetrate the other beams without collision with other molecules. The relatively rarified condition of the "active" gas beams accounts for the density increase in the cavity resonator. The density increase taught by this invention is not achieved by the mere mixing of gas, or by mere gas quantity alone, but by the use of a plurality of beams intersecting at such a low pressure that each beam is relatively undisturbed. The density component due to each separate beam is maintained throughout the intersection here. In a fluid collision, each beam would be broadened and scattered by the pressure built up at the region of collision. In an intersection of rarified beams, the increase in pressure in the region of beam overlap is not transmitted as in a fluid, for the molecular mean-free-path is much larger than the overlap distance. To utilize the non-fluid behavior of ammonia, the pressure in the active beams 47 should preferably be below $10^{-4}$ mm. of mercury. Below this pressure, the mean-free-path of the molecules begins to be an appreciable fraction of the beam width.

In another portion 61 of the graph of FIGURE 3, the density of the beam is shown after it leaves the region of beam overlap 53 as it passes through the cavity exit port 55. The gas density has dropped to the amount due to the gas of a single beam. This now refers to gas which has become essentially "inactive."

A short distance from the cavity 31 the molecules of the "inactive" ammonia beam enter the mercury vapor pumping beam 43 and are entrained by the pumping beam, and removed from the vicinity of the cavity. In another portion 63 of the graph of FIG. 3, the "inactive" gas density is shown as it drops rapidly within the mercury vapor pumping beam 43.

The pumping action of the mercury vapor beam 43 and the remaining paths of flow of the mercury vapor and the ammonia will be seen more completely by returning to FIG. 1.

Referring to FIG. 1, a mercury boiler 65 containing mercury 67 is heated by an electric resistance heater 69 which is supplied with electrical power through leads 71. One operating condition of the apparatus would utilize 110 v. A.C. 60 cycle "line" voltage.

Relatively large amounts of mercury vapor 73 are produced at the boiler, and travel up the pipe 75. The insulating layer 77 prevents the pipe 75 from cooling, so that no appreciable condensation of mercury vapor 73 occurs on the wall of the pipe 75. The mercury vapor 73 flows to an enlarged portion of pipe 79 and is delivered to the vicinity of the cylindrical nozzle block 81. The cylindrical nozzle block 81 contains a number of nozzles 83 to direct mercury vapor downward, past the cavity resonator 31. The cylindrical nozzle block 81 also has an attached conical portion 85 which cooperates with the wall of the large portion of the pipe 79 to define a region 87 for smoothly directing the flow of mercury to the nozzles 83. In operation, the mercury vapor heats the nozzle block 81, the conical portion 85 and the upper part 89 of the inner cylinder to a temperature approaching that of the mercury vapor. It is desirable to maintain the nozzle block 81 at the high temperature to minimize condensation of mercury vapor on the nozzle block 81. Several means have been provided to insulate the nozzle block 81 from heat loss to its environment, as well as to avoid heating the remainder of the apparatus. The nozzle block 81 is attached to the upper part 89 of the inner cylinder 19 at a small flange region 91 of the nozzle block. The flange region 91 has a small surface contacting the upper part 89 of the inner cylinder, so as to limit heat conduction from the nozzle block 81 to the upper part 89. A groove 93 cut in the inner cylinder 19 limits heat conduction downward from the upper part 89 to the intermediate part 95 of the inner cylinder 19 by forming a small cross-sectional area at region 97. The gap 99 between the nozzle block 81 and the intermediate part 95 is substantially empty, as it connects to the evacuated region contained within the apparatus. The gap 99 serves as a non-conducting insulator of heat flow from the nozzle block 81 to the intermediate portion 95. The upper portion 89 and intermediate portion 95 are insulated from the outer environment by the insulation layer 101. Another groove 103 limits the conducting cross-section at 105, so as to minimize heat flow from the intermediate portion 95 to the remaining portion 107 of the inner cylinder 19. The remaining portion 107 of the inner cylinder 19 is also cooled by cooling coils 109 containing a circulating coolant, such as water. A supply of cooling water is needed, to be introduced, for example, at one end 141 of cooling coil 109 and removed at end 143. One operating condition of the apparatus would use tap water at room temperature, having a rate of flow of about one gallon per minute.

The nozzle block 81 also supports a baffle plate 111 mounted so as to limit radiation of heat from the nozzle block 81 to the cavity resonator 31 and other parts of the apparatus.

The mercury vapor passing through the nozzles 83 is focused into beams 43 which are directed past the cavity resonator 31. Holes 113 are provided in the grid supporting insulators 115 to permit passage of the mercury vapor beams 43. Ammonia molecules leave the central portion of the cavity resonator 31 through the exit slots. The molecules are directed into the beam of mercury 43, and become captured and entrained by it, and carried rapidly downward toward a cooled mercury condenser block 117. The condenser block 117 is provided with tapered orifices 119 having an upper diameter 121 larger than the mercury beams 43, and a lower diameter 123 smaller than the mercury beams 43. The mercury beams 43 impinge on the wall 125 of the orifices 119 at a high angle of incidence (as measured from a normal to the surface). Part of the mercury beam 43 also passes into the mercury condensing chamber 13. The walls 125 of the orifices 119 lying in the condenser block 117 are cooled by the effect of the water-cooled coils 109. Much of the impinging mercury vapor beam 43 is condensed on the orifice walls 125. The condensed mercury, now a liquid, falls into a pool of mercury 127 at the bottom of the mercury condensing chamber 13. Part of the mercury vapor is condensed on the surface of the mercury pool 127 and part is condensed on the condensing chamber walls 129, due to the effect of the cooling coils 109. A smaller amount of mercury may spread to the inner cylinder 19, condense there due to cooling coils 109 and run down the wall of the inner cylinder to the mercury pool 127. The mercury in the pool 127 flows in the return pipe 131 toward the mercury boiler 65. As the condensed mercury raises the level of the pool 127, the level at the mercury boiler return inlet 133 raises, from time to time spilling some mercury into the boiler 65. It will be recognized that the entire mercury flow path is similar to the flow in a mercury diffusion pump. The sides of the mercury beams 43 shown as a sharp edge here for convenience of drawing will be somewhat diffuse in practice. The amount of expansion of the mercury vapor beams 43, as they leave the nozzles 83 and approach the orifices 119 will depend on the actual spacing dimension between the nozzles 83 and the orifices 119, so the orifice entrance diameter 121 is selected to fit the beam 43. These considerations are known in the art.

The mercury vapor beam 43 entering the orifice 119 contains entrained ammonia. After mercury is condensed at the cooled orifice walls 125 and mercury pool 127, the gas in the condenser chamber 13 becomes richer in ammonia, and less rich in mercury vapor. The mixture of mercury vapor and ammonia flows from the central portion of the condensing chamber 13 toward the openings 15 in the wall of the condensation chamber 13. Any gas molecule which may diffuse from the region of the condenser chamber 13 toward the orifice 119 is bombarded by the incoming mercury vapor beam 43 captured and entrained in it, and carried the short distance downward to a condensing surface in the condensation chamber. This action maintains a higher ammonia pressure in the condensation chamber 13 than in the regions 135 in the vicinity of the cavity resonator, which are essentially evacuated.

This pressure difference causes the ammonia in the condensation chamber 13 to flow through the openings 15 into the ammonia manifold chamber 17. Mercury is further condensed out of the ammonia at the condenser chamber walls 129 and the side 137 of the openings, as it flows into the ammonia manifold.

The ammonia manifold chamber 17 is cooled by coils 109 and serves to condense any remaining mercury vapor out of the ammonia gas, returning the mercury to the mercury condensation chamber back through openings 15.

The ammonia in the manifold 17 flows up the manifold to the collimator ports 23 as has been previously described, and continues to recirculate around a closed path. The amount of ammonia in the apparatus is regulated by an external source of ammonia 139 which may consist of a tank of ammonia under pressure, and associated valves, gauges, pumps, and fittings, or similar apparatus as is known in the art. One operating condition of the apparatus would utilize a pressure of about .2 mm. Hg of ammonia in the manifold region 17. Where a pump in the ammonia supply apparatus is capable of pumping excess gas out of the apparatus, the same pumping means may be used to initially evacuate the apparatus of air, before introducing ammonia.

It will be noted that the incoming ammonia beams 27 and the grid rods 29 all lie between two pumping beams of mercury vapor 43. The ammonia beams 27 pass freely between the mercury vapor beams 43 as the ammonia approaches the cavity resonator 31 but the ammonia beams 27 pass directly into the mercury beams 43 after they leave the cavity resonator. This is possible only by the use of an odd number of ammonia beams, where the beams are evenly spaced around a circle.

The preceding discussion has described parts of the apparatus concerned with the formation of the "active" body of gas 53 in the cavity resonator 31. Other parts of the apparatus will now be described, for the utilization of the body of gas 53 for microwave amplification or generation.

A source of microwaves 145 supplies microwave energy to a waveguide 147. Energy is propagated through the waveguide 147 to the cavity resonator 31. A hole 149 in the waveguide provides for coupling of this microwave energy into the cavity resonator, through an adjacent, cooperating hole 151 in the wall of the cavity resonator. The coupling holes are located for coupling to the $TM_{01n}$ mode of the cavity resonator, as is known in the art.

The microwave energy from the microwave source may be modulated or unmodulated, coherent or incoherent, pulsed or continuous, depending on the particular use made of the apparatus disclosed here. The microwave energy supplied to the cavity resonator passes through the body of "active" gas 53, and is amplified by the conversion of molecular internal energy to microwave energy. Amplified microwave energy is removed from the cavity resonator through output coupling holes 153 and 155. The amplified microwave energy propagates down the output waveguide 157 and is delivered to a load 159, which may be an antenna system, measuring equipment, detection apparatus, another microwave amplifier, or other equipment, depending on the particular use made of the apparatus disclosed here. No microwave input energy need be supplied when the apparatus of the disclosure is utilized as a microwave generator, and no input waveguide 147 is then needed. In this case, oscillation is sustained by the resonant action of the cavity as is known in the art.

A somewhat different form of resonator may be used for the amplification or generation of high frequency electromagnetic waves, in the sub-millimeter wavelength region. Scaling down a cavity resonator from centimeter wavelengths would result in a very small cavity that would be hard to manufacture, have low "Q," and be of such a size as to permit only a small amount of "active" gas to be inside it at any time. Instead, a parallel plate resonator may be used, having plates separated by a distance of several or many wavelengths of the generated frequency. For a particular frequency of operation, the gas volume in this resonator would be greater than in the kind of resonator that encloses only one or a few wavelengths of standing wave. The choice of the type of resonator that is suitable for a particular frequency of operation depends on the frequency, the required "Q" of the resonator, the coupling means, cavity material characteristics, and other considerations. It is usual, in the art, to select a form of resonator that is known to be of an appropriate type for operation within a range of frequencies according to the above-mentioned criteria.

*Second embodiment*

Figure 4:
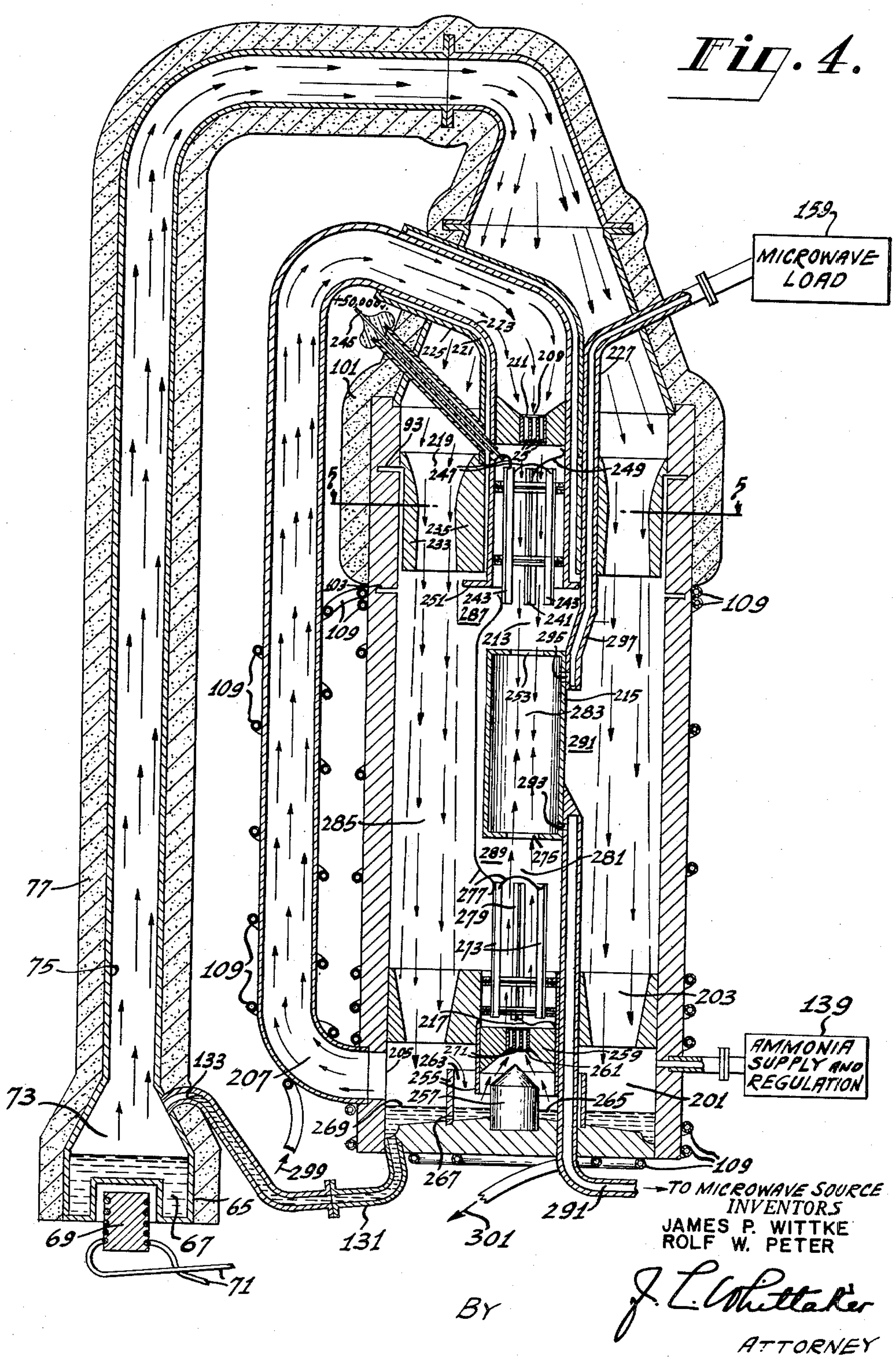
FIGURE 4 is a central sectional elevational view along the section line 4—4 in FIGURE 5, of a second embodiment of the invention.
Figure 5:
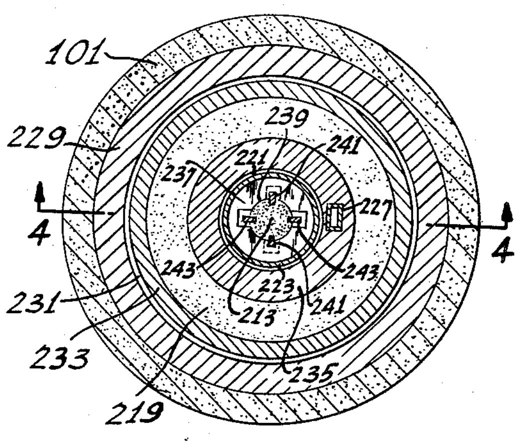
FIGURE 5 is a sectional top view of the apparatus of FIGURE 4, along section line 5—5 of FIGURE 4.

A second embodiment of the invention is shown in FIGS. 4 and 5. Referring to FIG. 4, inactive ammonia is delivered to the mercury condensing chamber 201 through the orifice 203. The mercury is condensed to liquid form in the condensing chamber 201, and part of the ammonia flows through the opening 205 into the pipe 207. The cooling coils 109 cool the ammonia, and complete the mercury condensation on the walls of the pipe 207. Ammonia flows in pipe 207 to the collimator port 209. A cylindrical collimator 211 in the collimator port 209 consists of a metal plug penetrated by long thin passages 25. The ammonia passes through the collimator passages 25 and is directed in a collimated beam 213 toward the cavity resonator 215. The ammonia beam 213 is parallel to focusing rods 241 and 243.

Mercury vapor 73 passes through a nearby nozzle 219. An insulating space 221 between the pipe 223 and a second concentric pipe 225 limits the heat flow from the mercury vapor 73 to the pipe 223, thereby keeping the ammonia relatively cool.

A nearby output waveguide 227 conducts microwave energy from the cavity resonator 215 to a microwave load 159.

The ammonia beam 213, mercury vapor nozzle 219, insulating space 221, focusing rods 241 and 243, and output waveguide 227 are seen in FIGURE 5, which is a sectional view of the apparatus of FIGURE 4, along section lines 5—5.

Referring to FIGURE 5, the outer layer of insulation 101 serves to limit heat loss from the cylinder 229. The gap 231 limits heat transfer from the outer portion 233 of the nozzle block. The mercury vapor nozzle 219 is a ring-shaped space bounded by an outer portion 233 of the nozzle block and an inner portion 235 of the nozzle block. A hollow cylindrical beam of mercury vapor is injected through the nozzle. The inner portion 235 of the nozzle block is penetrated by the output waveguide 227.

A gap 221 limits heat transfer from the inner portion 235 of the nozzle block to the ammonia pipe 223. Disks of mica 237, or similar insulation, support focusing rods 241 and 243. The ammonia beam 213 passes down the center of the group of focusing rods parallel to the focusing rods, and passes through holes 239 in the mica supports 237. An even number of focusing rods 241 and 243 are used. Alternate rods 243 are electrically connected together, and connected to an external source of potential. The remaining rods 241 are similarly connected to a potential highly differing from the potential of rods 243. The electric gradients at the center of the beam 213 are substantially lower than at the edge of the beam in the vicinity of the focusing rods. The selective focusing effect of this configuration on the "active" gas molecules is known in the art.

The geometry of the apparatus is substantially as shown in the figures. The behavior of this embodiment will be further seen by returning to FIGURE 4, which is a sectional view along section lines 4—4 of FIGURE 5.

Referring to FIGURE 4, the collimated and focused "active" ammonia beam 213 passes through the group of focuser rods 241 and 243. One source of potential is connected through leads 245 and 247 to the rods 243. The other rods may be grounded to the main body of the apparatus by leads 249. The apparatus is then externally grounded.

The flange 251 on the ammonia pipe 223 serves as a heat baffle between the nozzle block 235 and the cavity resonator 215. The grooves 93 and 103, and the insulation 101 and the cooling coils 109 function as in the apparatus of FIGURE 1, to keep the nozzle block 235 relatively hot, and the main body of the apparatus relatively cool.

The active ammonia beam 213 is directed into the cavity resonator 215 through a hole 253 in the cavity resonator. At the same time, part of the ammonia in the condensing chamber 201 flows through cooled baffle pipes 255 which provide a moderately long path for the condensation of mercury. A cooling block 257 cooperates with the lower collimator block 259 to direct ammonia into the collimator port 261 and to provide additional condensing surface for mercury condensation. Mercury condensed within the baffle space 263 drops into the inner mercury pool 265 and flows through holes 267 to the outer mercury pool 269.

Ammonia flows through the lower collimator passages 271, past the focusing rods 273 and 279 through the hole 275 in the cavity resonator 215. The focusing rods 273 are supplied with potential through the leads 277. Rods 279 are grounded through leads 217. The ammonia beams 213 and 281 intersect in the cavity resonator 215 and form a relatively dense "active" gas body 283.

The ammonia beams 213 and 281 pass through the cavity resonator, and most of the ammonia leaves through the opposite holes, each of which is also occupied by an incoming beam. The two beams do not drastically interfere with each other, as they are relatively rarified beams. The "inactive" ammonia beams leave the cavity, and bombard the focuser rods, collimator, and mica supports. The ammonia diffuses from these regions into the main body of the apparatus 287, 289, 291 and into the mercury pumping beam 285. Any gas which has spread out of the beams within the cavity, migrates around within the cavity until it diffuses out of the cavity holes 253 and 275 into the main body of the apparatus 287, 289, 291.

The mercury vapor pumping beam 285 leaves the nozzle and is so directed as to pass the cavity resonator 215 and enter the orifice 203. The mercury vapor pumping beam 285 is a hollow cylinder with the cavity resonator at its center, in this embodiment. Inactive ammonia in the regions 287, 289 and 291 diffuses into the mercury vapor pumping beam 285 and is carried in the pumping beam through the orifice 203 into the condensing chamber 201. The flow of ammonia through the opening 205 has been described.

The mercury vapor is condensed to liquid form in the condensation chamber 201 due to the cooling effect of cooling coils 109. The mercury forms a pool 269, and runs out from pool through pipe 131, through the mercury return opening 133 to the mercury boiler 65. As in the preferred embodiment of FIG. 1, the mercury vapor 73 flows up the pipe 75. Mercury vapor flows through the nozzle 219, as has been described.

Microwave energy from a microwave source enters the cavity resonator 215 through the waveguide 291 and coupling hole 293. The cavity resonates in the $TM_{010}$ mode. Microwave energy passes through the body of active gas 283 and is amplified by the interaction with the gas. Microwave output energy is removed through coupling hole 295 and the output waveguide 297. The amplified microwave energy is utilized at the microwave load 159.

As in the preferred embodiment, a supply of cooling water is introduced at the end 299 of the cooling pipe, at about 1 gallon per minute flow rate. Mercury boiler heater power is needed, such as 110 v., 60 cycle "line" voltage. Ammonia is supplied to the apparatus from the ammonia supply 139. A source of potential, such as +50,000 v. D.C., is supplied at lead 245 for the focusing rods 243 and 273.

*Third embodiment*

Figure 6:
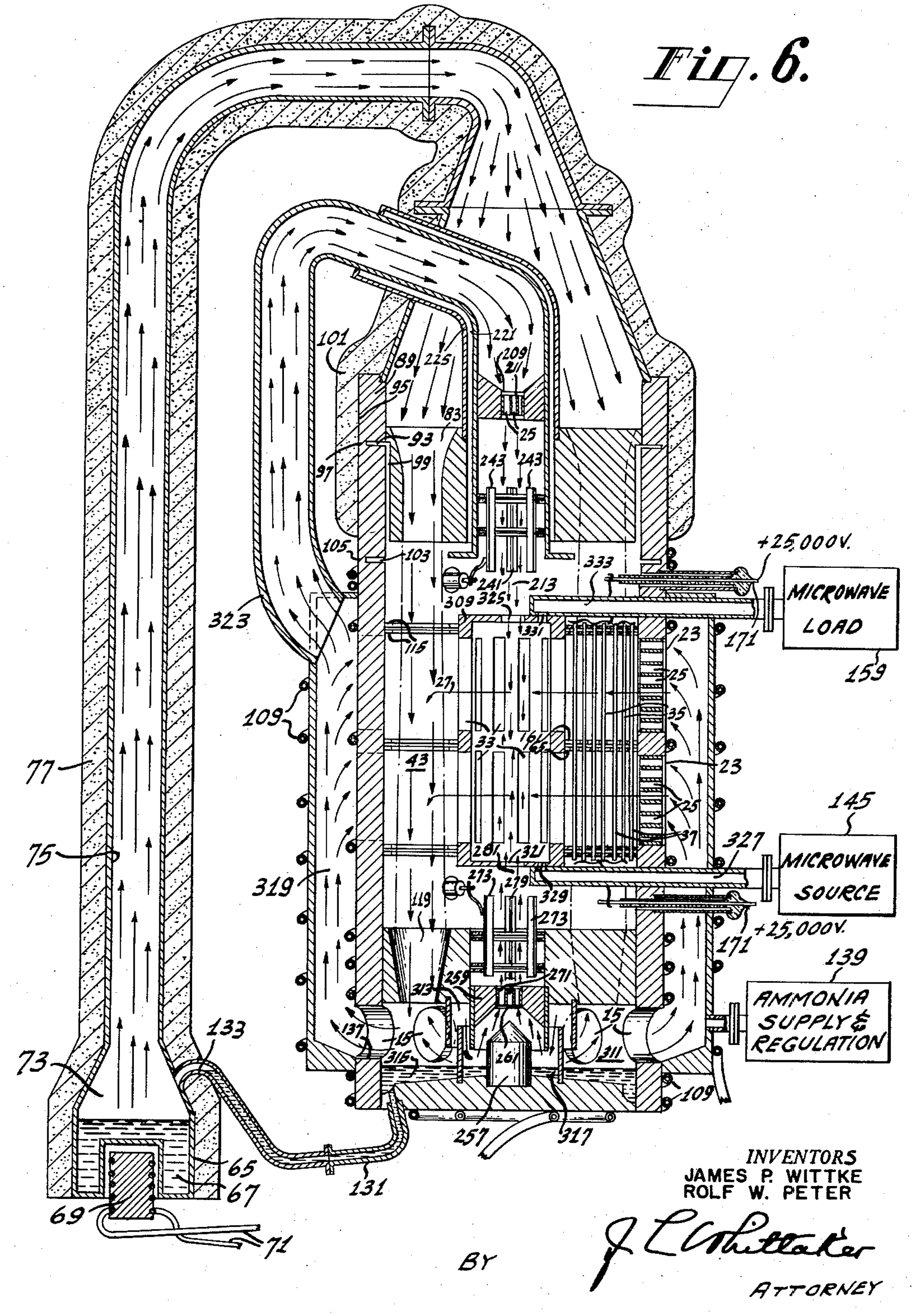
FIGURE 6 is a central sectional elevational view of a third embodiment of the invention.

A third embodiment of the invention is shown in FIG. 6. This embodiment provides for the radial injection of a plurality of "active" gas beams, supplemented by the axial injection of "active" gas beams from each end of the cavity resonator.

The flow of mercury vapor is similar to the flow in FIGURES 1 and 4. Mercury vapor 73 passes up the pipe 75 and downward through the nozzles 83. The mercury vapor beams 43 are formed by the nozzles, pass the cavity resonator 309, and enter the orifices 119. The mercury is condensed in the condensation chamber 311, and in the baffle space 313. The condensed mercury runs into the mercury pools 315 and 317, and flows into the pipe 131. Mercury overflows at 133 into the boiler 65, where it started from.

The ammonia flows from the condensation chamber 311, through the ports 137, and into the ammonia manifold chamber 319. Ammonia flows into the collimator ports 23, through the passages 25, and past the grids 35 and 37. The ammonia is formed into "active" beams by the grids, and the "active" beams pass into the cavity resonator 309 through the slots 33.

At the same time, ammonia from the condensation chamber 311 passes through the baffle space 313 and enters the collimator port 261. The ammonia is collimated by the passages 271, passes the focuser rods 273 and 279, and is formed into the active beam 281. The active beam enters the cavity resonator 309 through the entrance hole 321.

Similarly, ammonia from the ammonia manifold 319 enters the pipe 323 and passes through the collimator 211. The passages 25 form a collimated beam 213 which has been made "active" by the focuser rods 241 and 243. This beam 213 enters the cavity resonator 309 through the entrance hole 325.

The axially injected "active" beams 213 and 281, and the radially injected "active" beams 27 all intersect in the cavity resonator 309, and form a relatively dense body of active gas.

Microwave energy from the source 145 passes through the waveguide 327 and through the coupling hole 329 into the cavity resonator. The cavity resonates in a $TM_{01n}$ mode. The microwave energy passes through the "active" gas in the cavity, is amplified by the interaction with the gas, and passes out of the cavity through coupling hole 331. The output microwave energy propagates through the output waveguide 333, to the microwave load 159, where it is utilized. The radially injected "active" beams 27 pass out of the cavity through slots 33, after becoming "inactive," and pass into the mercury pumping beams 43. The axially injected beams 213 and 281 pass through the cavity and out the opposite sides, at holes 321 and 325, and bombard the micas, focusing rods and collimators in their paths. This gas then diffuses into the mercury pumping beams 43. Some of the gas from the injected beams is dispersed from the beams within the cavity and fails to pass directly out of the opposing holes. This gas diffuses out of the cavity indirectly, through the holes 321 and 325 as well as slots 33. This gas also diffuses into the mercury pumping beams 43 and is returned to the condensing chamber 311, where it started from.

The details of this embodiment, such as the supporting micas 115, insulating grooves 93 and 103, cooling coils 109, and focusing rods 273, 279, 241 and 243 are the same as in the preceding embodiments, and the operating conditions of cooling water flow, boiler heater voltage, ammonia supply pressure, and focuser rod potentials are also the same.

The mica discs 161 and 165, the clearance holes, the grid rods 35 and 37, and other nearby parts are shown in FIGURE 9, which repeats a portion of FIGURE 6 drawn to a larger scale, for convenience of illustration.

FIGURE 9 also illustrates the apparatus of FIGURE 1, except for the location of coupling hole 331, and the end of the adjacent waveguide 333.

*Modification of FIGURE 4*

Figure 7:
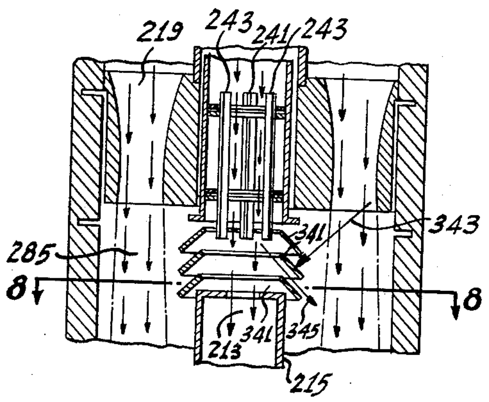
FIGURE 7 is a fragmentary elevational sectional view of a modification of a portion of the apparatus of FIGURE 4.
Figure 8:
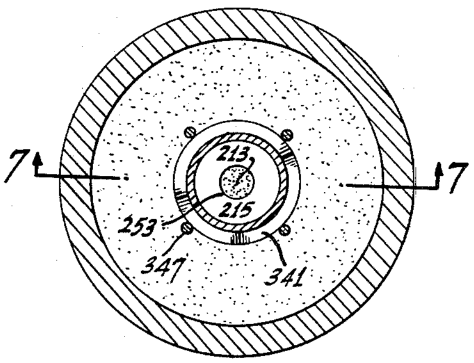
FIGURE 8 is a fragmentary sectional view of the apparatus of FIGURE 7.

A modification of the embodiment of FIGURE 4 is shown in FIGURES 7 and 8. Referring to FIGURE 7, a portion of the apparatus of FIGURE 4 is shown, including the mercury vapor nozzle 219, the mercury vapor beam 285, the focusing rods 241 and 243, the "active" ammonia beam 213 and the cavity resonator 215. In addition to these parts, baffles 341 are utilized in this embodiment. These baffles are shaped and located so that a mercury molecule 343 which may stray downward from the beam 285 and inward towards the cavity resonator 215 is blocked from entrance to the cavity resonator by the baffles. The "inactive" ammonia molecules 345, however, diffuse freely through the baffles, moving downward and outward into the mercury pumping beam 285. The baffles are permeable to these "inactive" ammonia molecules because of the baffle's shape and location.

Shielding slats similar to baffles 341 may be arranged between focusing grid bars and pumping gas streams in the apparatus of FIGURES 1, 4 and 6 to prevent the pumping gas from penetrating into the region of interaction of the molecularly resonant gas with the microwave field.

This embodiment is further illustrated in FIGURE 8, which is a sectional view of the apparatus of FIGURE 7, along section lines 8—8.

Referring to FIGURE 8, the baffles 341 prevent mercury vapor 285 from entering the cavity resonator 215 with the "active" beam 213 through entrance opening 253. Support rods for the baffles are shown at 347.

High potentials may be applied to the baffles to utilize them as "active" gas focusers, in addition to, or instead of, the focusing rods 241 and 243.

The mercury condensing action of the baffles would be increased by cooling the baffle.

What is claimed is:

1. In combination, an evacuated container; means for directing an active energetic beam of molecular resonant gas at a pressure of not greater than millimeters of mercury into an interaction region in said container which permits the gas to escape after it has given up its energy in the form of electromagnetic energy; means for directing a beam of molecules of a heavy pumping gas into said container into said escaping gas in a direction to carry said escaping gas away from the vicinity of said interaction region; means for separating the escaped gas from the pumping gas; and means for reforming the separated escaped gas into an active energetic beam and directing the same into said interaction region, whereby said resonant gas is continuously circulated.

2. In a resonant gas amplifier or generator of the type in which at least one active energetic beam of a molecular resonant gas at a pressure of not greater than millimeters of mercury having more molecules in the upper than in the lower of two energy states is passed into an interaction region and there gives up its energy in the form of electromagnetic energy, means for permitting the gas, after it has released its energy, to pass out of the interaction region; means for directing a stream of a heavier gas than said resonant gas into the gas which has passed out of the interaction region so as to capture said gas; means for separating the captured gas from the heavy gas; and means for producing from the separated gas a beam which has more molecules in the upper than the lower of two energy states and passing the same into said interaction region, whereby closed loop operation is achieved.

3. In a microwave resonant gas amplifier or generator of the type in which a plurality of active energetic beams of a molecular resonant gas at a pressure of not greater than millimeters of mercury having more molecules in the upper than in the lower of two coupled energy states passes through entrance holes in a wave transmission means and give up their energy in the form of electromagnetic energy within said wave transmission means, said wave transmission means being formed with a plurality of exit holes aligned with said entrance holes for permitting the beams to pass out of said wave transmission means after they have released their energy; means for directing a plurality of streams of a heavier gas than said resonant gas along the outer surface of said wave transmission means adjacent to said exit holes, whereby said streams of heavy gas capture the resonant gas which passes out of said wave transmission means; means spaced from said wave transmission means into which said streams of heavy gas pass for separating the captured gas from the heavy gas; means for producing from the separated gas a plurality of second active energetic beams of said separated gas having more molecules in the upper than in the lower of said two coupled energy states and means for passing said second beams through said entrance holes in said wave transmission means and into said interaction region, whereby closed loop operation is achieved.

4. Apparatus for concentrating the molecules of a molecular resonant gas comprising, an evacuated container; a plurality of means, each for producing an intense inhomogeneous electric field within said container, each said field including a first region of low field strength which extends along a line and a region of high field strength which surrounds the first region, said regions of low field strength all being directed toward a common interaction region within said container; and means for directing a plurality of streams of rarefied active molecular resonant gas at pressures not greater than a fraction of a millimeter of mercury, one into each said field along the region thereof of low field strength, whereby said electric fields focus the molecules in the higher of the coupled energy states of the gas into beams and direct said beams toward said common interaction region.

5. Apparatus as claimed in claim 4 wherein the pressure of said gas streams is sufficiently low for the mean-free paths of the molecules of said gas to be a substantial fraction of the stream width.

6. Apparatus as claimed in claim 4 including means for establishing a field in said interaction region at a frequency characteristic of the transition between two coupled energy states of said resonant gas.

7. Apparatus as claimed in claim 4 wherein at least some of said beams intersect one another within said interaction region.

References Cited in the file of this patent

UNITED STATES PATENTS

| | | |
|---|---|---|
| 2,068,748 | Kleir | Jan. 26, 1937 |
| 2,398,818 | Turner | Apr. 23, 1946 |
| 2,443,070 | Hobbie | June 8, 1948 |
| 2,707,235 | Townes | Apr. 26, 1955 |
| 2,762,871 | Dicke | Sept. 11, 1956 |
| 2,762,872 | Dicke | Sept. 11, 1956 |
| 2,851,652 | Dicke | Sept. 9, 1958 |
| 2,879,439 | Townes | Mar. 24, 1959 |